Dec. 13, 1932. J. T. BARKELEW 1,890,490
FILM DEVELOPING SYSTEM
Filed March 30, 1931 6 Sheets-Sheet 1

Inventor

Dec. 13, 1932.  J. T. BARKELEW  1,890,490
FILM DEVELOPING SYSTEM
Filed March 30, 1931  6 Sheets-Sheet 2

Inventor

Dec. 13, 1932.   J. T. BARKELEW   1,890,490
FILM DEVELOPING SYSTEM
Filed March 30, 1931   6 Sheets-Sheet 3

Inventor

Dec. 13, 1932.  J. T. BARKELEW  1,890,490
FILM DEVELOPING SYSTEM
Filed March 30, 1931   6 Sheets-Sheet 4

Inventor

Inventor

Patented Dec. 13, 1932

1,890,490

UNITED STATES PATENT OFFICE

JAMES T. BARKELEW, OF PASADENA, CALIFORNIA, ASSIGNOR TO PARAMOUNT PUBLIX CORPORATION, OF NEW YORK, N. Y., A CORPORATION OF NEW YORK

FILM DEVELOPING SYSTEM

Application filed March 30, 1931. Serial No. 526,150.

This invention relates generally to the art of propelling long strips, such as motion picture film, through liquid or fluid baths. The present invention is designed primarily for use in developing, fixing, washing and drying motion picture film, and is therefore spoken of primarily in that connection, but it will be understood the invention is also applicable to propulsion of film or other strips through other baths as well.

In developing motion picture film, the film strip is ordinarily run in succession through the developing solution, the fixing bath, the water wash, any other treating baths, and finally the dryer, the film strip being continuously supplied to the developer bath and being delivered continuously from the dryer. Parts of the same film strip are thus in the wet bath while other parts are passing through the dryer. The principal difficulty heretofore encountered in propelling the film through such baths has arisen from the gradual expansion of the film as it becomes wet and shrinkage of the film as it dries. Since one part of the film strip may be undergoing wet treatment, and therefore be expanding, while another part of the film may be undergoing drying and therefore be shrinking, both elongation and shrinkage must be contended with in the same film strip. And each and both such conditions lead to a set of difficulties so well recognized in the art as to require no detailed account here.

Reference is here made to an application entitled "Film developing system," Ser. No. 489,600, filed October 18, 1930, by Ingman, Garbutt and myself, in which is disclosed a film developing system designed to avoid all such difficulties as are above referred to. In accordance with the system therein disclosed the film is propelled through the various baths by force arising from the flow of the bath liquids through the bath containers. This is accomplished, in the preferred illustrative form therein described, by flowing the several treating liquids continuously through successive conduits and causing the film to be dragged along by propulsive force arising from skin friction of the flowing treating liquids on the film.

The present invention, while within the broad scope of the general method comprising moving the film strip by force arising from flow of the treating liquids, departs from the specific method of moving the film solely by the skin friction of the flowing liquids. According to the present invention, impellers preferably in the form of undershot wheels are driven by the flowing treating liquid, and these impellers in turn operate film drive rollers around which the film is threaded. Numerous advantages arise from such an arrangement, all of which will be made apparent from the following description.

It may here be noted that insofar as the prior application above referred to broadly describes and claims the method of moving the film strip by force arising from flowing the treating liquid, it is generic to the present application and properly includes claims of a scope broadly covering the present invention. Reference is also made to my copending companion applications filed on even date herewith and entitled respectively "Film developing system," Ser. No. 524,361, filed March 21, 1931, and "Film developing system," Ser. No. 525,130, filed March 25, 1931.

The present invention will be more fully understood in its various aspects from the following description of several typical embodiments thereof, reference for this purpose being had to the accompanying drawings, in which.

Referring first to the form of my invention shown in Figs. 1 to 8, inclusive, I show at 10 a suitable rectangular tank, which is divided into a number of successive treating units 10a, 10b and so on by main transverse partitions 11. In the drawings only the first unit 10a and the beginning of the second 10b are shown, but it will be understood how the construction is continued in practice to provide any number of such units required.

Each treating unit, such as unit 10a, is divided into long transverse compartments, such as a, a1, a2, and a3 for unit 10a and b, b1, and so on for compartment 10b, by a series of vertical partitions 14, which are preferably arranged to be vertically removable. The vertical or side edges of said partitions 14 slide between guide strips 15 affixed to the side walls 16 of said tank 10 (Fig. 8), while the lower edges of the partitions are taken between transverse strips 17 affixed to the bottom 18 of the tank. The bottom and side edges of partitions 14 are thus in substantially liquid tight engagement with the walls of the tank.

Figure 1:
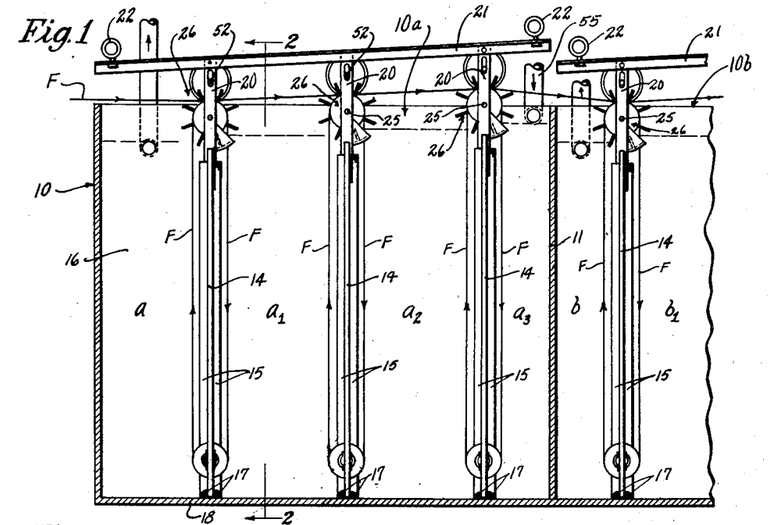
Fig. 1 is a side view of the apparatus, the near side wall of the tank being removed.

The upper edges of partitions 14, adjustable as hereafter described, are below the liquid levels established in the successive compartments of the tank, and the height of successive partitions decreases in the direction of liquid flow, which is from right to left in Fig. 1, all as will be more fully understood hereafter. Affixed to the upper corners of partitions 14 are hangers 20, which are here shown suspended from longitudinally extending angle irons 21, said angle irons being provided with lifting rings 22 by means of which the several partitions 14 of any one unit may be removed from the tank at once.

Mounted over each partition 14 in suitable bearings provided by the corresponding pair of hangers 20 is a horizontal shaft 25. Each shaft 25 has on each of its ends, just inside hangers 20, an impeller preferably in the form of an undershot wheel 26, which is adapted to be driven by the flow of liquid over the flow edge 14a of partition 14, the blades 27 of the wheel just clearing said edge 14a. Preferably, at each wheel there is provided a channel embodying a lower wall 29 curving rearwardly from edge 14a a short distance around the wheel, and having side walls 30, said channel confining the liquid that operates the wheel, as well as giving to the device the advantageous characteristics of a breast wheel, in which the weight of the water as well as its velocity is utilized as a source of power. Between wheels 26 the upper edge of partition 14 is cut a short distance lower, as indicated at 34. A level establishing gate 35 mounted face to face with the right hand surface of partition 14, as viewed in Fig. 1, is arranged to slide vertically in slides 36 affixed to partition 14, clamping screws 37 being provided in guides 36 to hold said gate with its upper edge at any desired elevation. It will be understood that the elevation of this wide gate determines the height of liquid in the compartment behind it, and therefore primarily the quantity of liquid that will flow through each of the channels 30 and overflow edges 14a to drive the undershot wheels. For instance, with the gate elevated to the position shown in Fig. 3, the liquid level 1 in the compartment of the rear of the wheel will be sufficiently high to insure a maximum of flow through the water-wheel channel and a maximum of power will be derived from the liquid driven impeller. On the other hand, if the gate is dropped to a lower elevation, liquid will flow over the gate until its liquid level is practically down to the gate edge, after which the liquid flow through the water-wheel channel and the power derived from the water wheel will be correspondingly decreased. Thus the adjustment of gate 35 controls the liquid level back of the water wheels, and in this way controls the power of said wheels.

Rigidly mounted on each of the wheel driven shafts 25 is a series of spaced film rollers 40 (Fig. 5), said rollers having film treads 41 and being undercut between said treads to clear the film. Each partition 14 has near its lower edge a long transverse aperture 44 of substantially the length of the series of film rollers 40 on shaft 25. Mounted in this aperture and journaled in suitable bearings affixed to partition 14 is a horizontal shaft 46, upon which is freely mounted a series of independent lower film rollers 47, arranged in staggered relation to upper rollers 40. Lower rollers 47, which are preferably free of each other, have long hubs 47a which serve to space them properly on the shaft. To prevent substantial liquid flow from compartment to compartment through aperture 44, upper and lower plates 48 and 49 having respectively edges 48a and 49a cut to the contour of the rollers are mounted in the aperture, as clearly shown in the drawings.

Mounted over each shaft 25 is a shaft 52 having presser rolls 53 resting on the edges of the film F threaded over rollers 40. I have here shown the presser rolls 53 provided with flanges 54 for retaining the film on rollers 40, although it will be understood that said flanges may be on the rollers 40 instead, if desired. The ends of shaft 52 are taken in vertically elongated slots 56 formed in hangers 20 to permit a vertical movement of shaft 52 and the presser rolls with reference to film rollers 40. The function of the presser rollers is merely to keep the film in contact with the upper driving rollers.

The incoming film F is threaded over an end upper roller 40 on the left hand shaft 25 (as viewed in Fig. 1), from there downwardly through compartment a1 to the corresponding lower roller 47 around which it passes to enter compartment a, thence rising through compartment a to the second upper roller 40, thence again down through compartment a1 to the second lower roller 47, and so on in a long spiral to the other upper end roller 40. From there the film passes forwardly to the corresponding upper end roller 40 of the next row, where it passes through compartments a2 and a1 over upper and lower rollers 40 and 47 in another long spiral to the opposite end of the latter row. In this manner the film spirals around however many sets of upper and lower roller rows are provided in unit 10a. As here shown the film finally leaves said unit 10a to pass directly to the first upper roller of the second unit 10b, through which it may pass in a similar manner; and it will be understood how any number of such units may be provided as circumstances require, the film finally being taken from the outgoing end of the final unit by any suitable take-up means, as later to be described.

The developer or other liquid is initially introduced to the apparatus through an inlet 55 arranged preferably in the upper end of compartment a3. The developer takes a level in said compartment a3 depending first upon its rate of supply, and second upon its rate of discharge from the compartment, which latter is controlled by the position of gate 35. The higher this level is maintained with reference to the impeller wheels, the greater of course will be the power and speed given to the wheels. Now it will be assumed first that a condition has been established in which the liquid supplied to the compartment all flows through the wheel channels and does so at the rate of liquid supply to the compartment, the gate being somewhat above the stabilized level then existing in the compartment. If the rate of liquid supply to the compartment then be gradually increased, the wheel channels will first take the increase, which will increase the power of the wheels, but when more liquid is supplied to the compartment than can flow through the channels the liquid level will rise in the compartment until it overflows the gate. In case it is then desired to decrease the speed of the wheels, the rate of liquid supply remaining constant, the gate can be dropped to lower the liquid level in the compartment until the quantity of liquid flow through the wheel channels is reduced to the point where the desired speed and power of the wheels is obtained. Thus, with the rate of liquid supply constant, by adjustment of gate 35 the liquid level in the compartment can be varied until the exact speed desired of the wheels is obtained. Of course, with the gate fixed the wheel speed can also be controlled by varying the rate of liquid supply to the compartment, which will in turn vary the level in said compartment and thereby vary the quantity of water that flows through wheel channels. In any case the liquid level in the compartment, which is dependent both upon the position of the gate and the rate of liquid supply, determines the power and speed of the wheels. In practice the liquid is supplied preferably in such quantity as always to overflow the gate, and speed control is then by gate adjustment only. Primarily the adjustment of the discharge gate for any compartment will control discharge from that compartment. If, however, the gate of the next compartment is raised so as to establish a liquid level above the discharge level of the wheels of the first compartment, (see e. g. the levels indicated in Figs. 1 and 3) the liquid flow is then controlled in the first, as well as the second compartment, by position of the second gate, as well as that of the first gate. Thus additional speed control is provided.

Once running operations are established, the total liquid flow from compartment a3 to compartment a2, both over gate 35 and through the water wheel channels, is equal to the rate of liquid supply to compartment a3. Therefore, by giving to the gate 35 that is associated with the wheels driven by liquid flow from compartments a2 to compartment a1 an adjustment with reference to said wheels exactly similar to the adjustment of the gate 35 associated with the wheels driven by liquid flow from compartment a3 to compartment a2, both said sets of wheels will normally be driven at exactly the same speed; and by a corresponding adjustment of the remaining gates all of the wheels will tend to have the same normal speed of rotation.

When the above described adjustments are made, the film rollers 40 rigidly mounted on the wheel shafts 25 thus all tend to rotate at the same peripheral speed. These rollers have proper driving engagement with the film by virtue of the weight of presser rolls 53, which bear down on the film edges as shown best in Fig. 5. The lower rollers 47 are freely mounted on their shafts and are independent of each other, so that the spirally wound film length on each row of upper and lower rollers is driven only at a number of spaced points equal to the number of upper rollers. The two liquid driven impellers or wheels 26 on each shaft 25 must supply power sufficient to drive, and in practice slightly to overdrive, the rollers and film, and in a practical design the impellers must of course be of sufficient size or number to meet this requirement. Thus while I have here shown but two impellers for each shaft, this number may obviously be increased when required, and a form of my invention to be described hereinafter involves the use of additional impellers, although the present form requires only that the two impellers be of sufficient size to supply the power necessary.

Figure 1A:
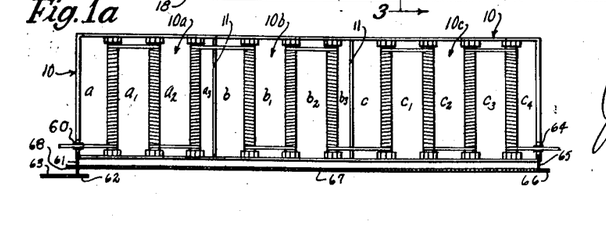
Fig. 1a is a more or less diagrammatic plan view of the apparatus showing film feeding and take-out means.
Figure 2:
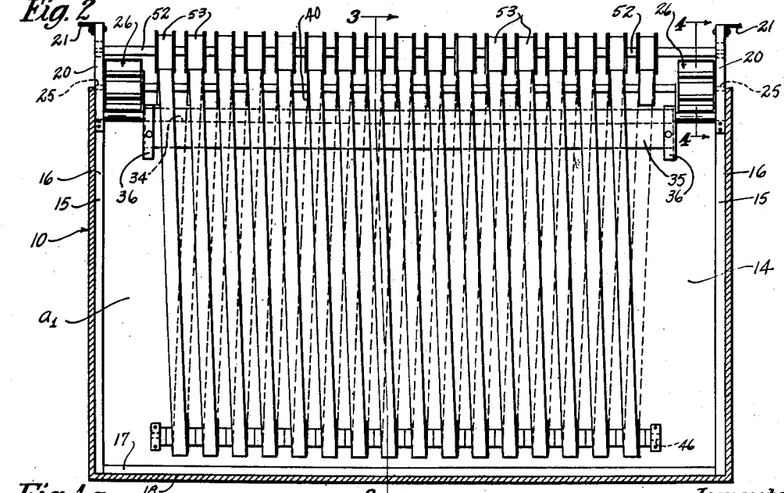
Fig. 2 is a vertical transverse section taken on line 2—2 of Fig. 1.
Figures 3, 4, 5, 6:
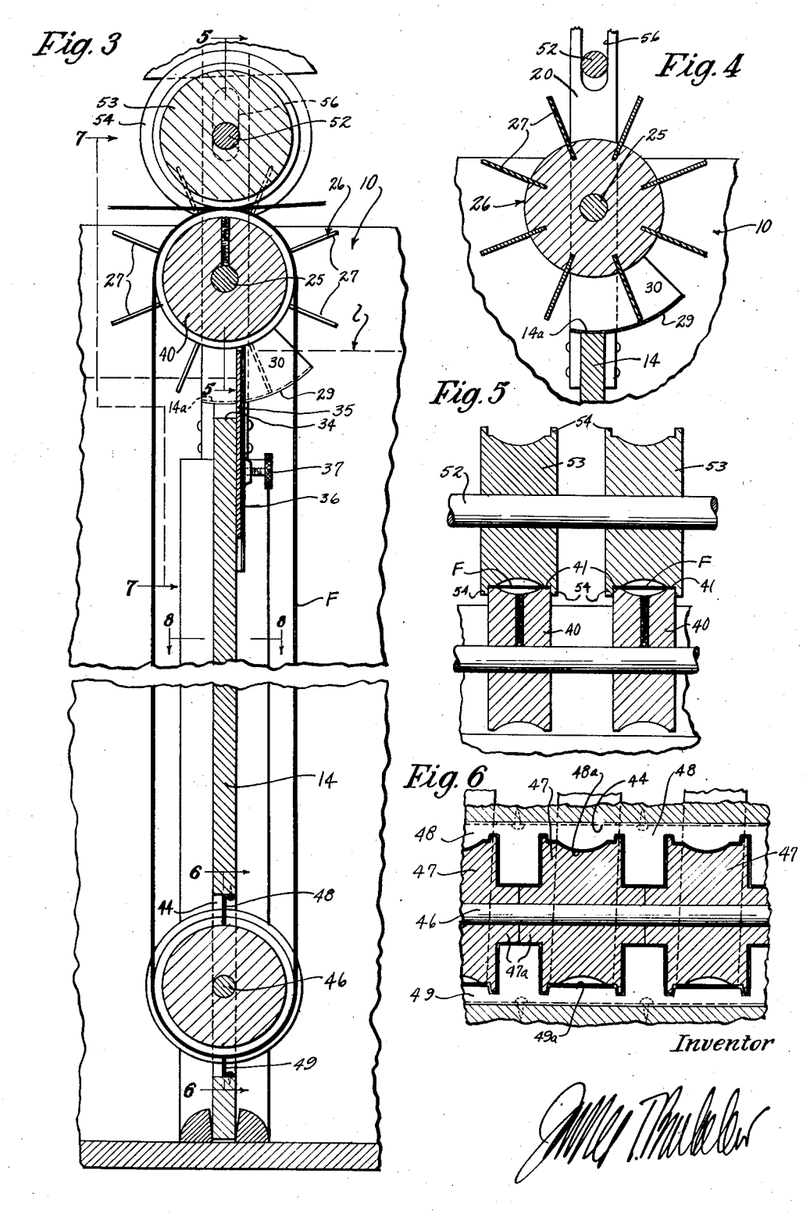
Fig. 3 is a vertical detail section taken on line 3—3 of Fig. 2.
Fig. 4 is a vertical detail section taken on line 4—4 of Fig. 2.
Fig. 5 is a vertical section taken on line 5—5 of Fig. 3.
Fig. 6 is a vertical section taken on line 6—6 of Fig. 3.
Figure 7:
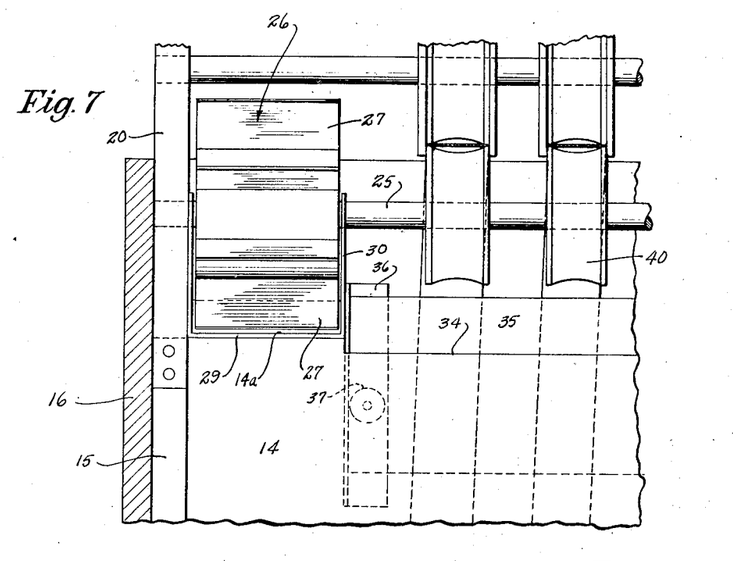
Fig. 7 is a view taken as indicated by line 7—7 of Fig. 3.
Figures 8, 12:
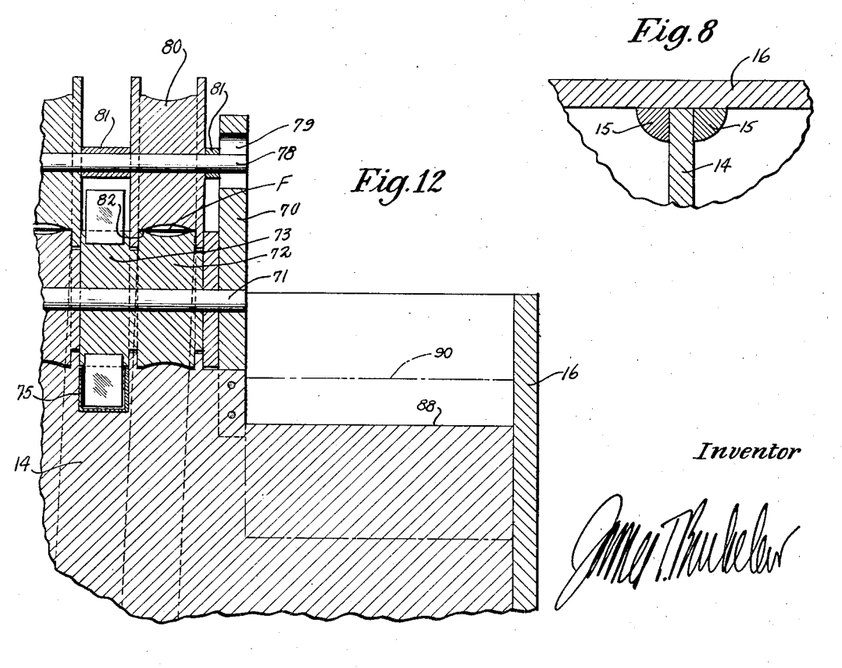
Fig. 8 is a detail section taken as indicated by line 8—8 of Fig. 3.
Fig. 12 is a detail section taken as indicated by line 12—12 of Fig. 10.

In Fig. 1a I have shown more or less diagrammatically a preferred means for feeding the film to the ingoing end of the above described system and finally taking it out of the system at the end of the treatment. Tank 10 is shown as embodying units 10a, 10b and 10c, which may be considered as the developer, hypo and wash units, respectively. The film F is positively fed to the first film roller by means of a film sprocket 60 carried on a shaft 61 supported on the edge of tank 10, shaft 61 having a sprocket 62 constantly driven by a chain 63.

When this constantly driven feed sprocket 60 is used in connection with the machine shown in Figs. 1 to 8 inclusive, or in connection with variational machines to be hereinafter described, there is thus a positive hold-back on the ingoing end of the film, and in such cases it is preferable to adjust the system so that the speed of the liquid driven impeller wheels tends to be just slightly greater than the speed permitted by the hold back sprocket, thus giving a slight frictional overdrive and tension, although not sufficient unduly to strain the film.

In operation the film holds back on the wheels, reducing their speed over that which would result without the film threaded on the rollers. It will be apparent, therefore, that any looseness or slack coming into the film by virtue of elongation due to wetting produces a relief of load which results immediately in temporarily increased speed of the wheels and rollers over which the elongation occurs, it following that any such slack is worked forwardly through the machine to accumulate at the outgoing end.

In order to allow the forward creep of slack due to elongation, and not to allow it to accumulate in any one spiral, the presser rolls 53 must in this form allow a slight amount of slippage of the film on the drive rollers. This feature of slight slippage necessary in this form of machine is not present in the form of machine about to be described in which each roller is provided with a driving wheel.

At the outgoing end of unit 10c the film passes over a film sprocket 64 carried on a shaft 65 mounted on the edge of the tank, said shaft 65 having a sprocket 66 connected by chain 67 to a drive sprocket 68 on shaft 61, By this arrangement there will be no slip at either the ingoing or outgoing ends and there will always be a constant length of film (a constant number of sprocket holes) in the machine. Of course, the wet film always tends to elongate, and such elongation will vary with different samples of film, but within such limits the length of film between the hold-back and take-out sprockets 60 and 64, respectively, is constant. As above described, any slack in the film is moved forwardly through the machine and tends to accumulate just ahead of take-out sprocket 64. It will be understood, however, that this accumulatin of slack is within certain limits, constant in amount and does not continue to grow once running conditions are established. From the above it will be understood that the take-out merely removes the film from the machine, and does not function to pull the film through.

A frictional hold-back and a frictional take-out can be substituted for the sprocket hold-back and sprocket take-out, if desired. A frictional take-out exerting just enough frictional pull to take the film out from the last roller but not enough to pull the film through the machine may be desirable over a sprocket take-out operating on wet and soft film. A simple form of frictional take-out can be made, for instance, at 64 by taking the sprocket teeth off that roller and making the frictional driving diameter of that roller slightly larger than the pitch diameter of feed roller or sprocket 60. However, any other frictional drive may be used.

In Figs. 9 to 12 inclusive, there is shown another form of my invention, generally similar to that described, but in which an individual undershot wheel is provided for each drive roller. In this form there is again provided the tank 10 having side walls 16, bottom 18, and transverse partitions 14.

Each partition 14 is provided, at points spaced inwardly from side walls 16 (Figs. 9 and 12) with hangers 70, similar to hangers 20 of the previous form. Rigidly mounted in hangers 70 over partition 14 is a horizontal shaft 71, and mounted to rotate on said shaft is a series of individual film drive rollers 72, each having an individual undershot wheel 73. The upper edge of partition 14 is formed below film rollers 72 to follow the contour thereof, leaving but slight clearance with the rollers so that the passage of liquid under the rollers is substantially cut off. Mounted in the upper edge of partition 14 below wheels 73 are wheel channels 75.

Mounted over shaft 71 is a shaft 78, the ends of which are taken in vertically elongated slots 79 in the upper portions of hangers 70. Loosely mounted on this shaft 78 is a series of presser rolls 80, one over each film roller 72, and laterally positioned on shaft 78 by spacer sleeves 81, the treads 82 of said rolls resting down on the edges of the film F threaded over rollers 72, as clearly shown in Fig. 12.

Figure 9:
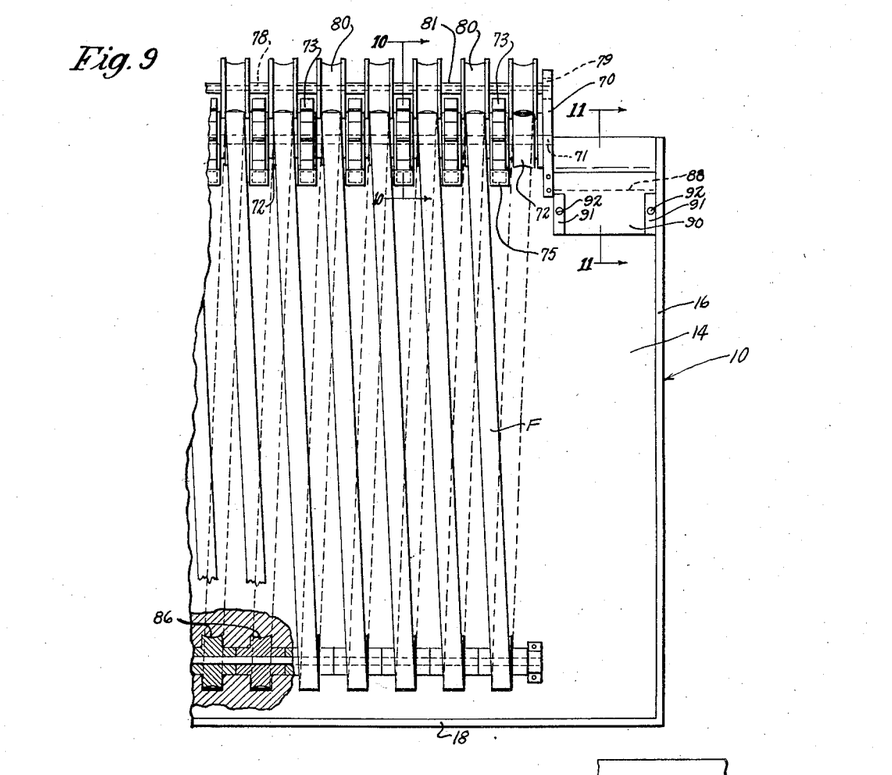
Fig. 9 is a fragmentary view similar to Fig. 2 but showing a variational embodiment.
Figure 10:
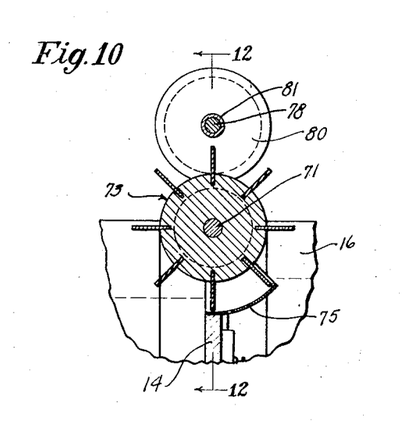
Fig. 10 is a section taken on line 10—10 of Fig. 9.
Figure 11:
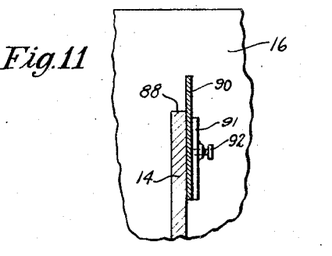
Fig. 11 is a section taken on line 11—11 of Fig. 9.

The lower portion of each partition 14 is provided in a manner similar to the form previously described, with a suitable opening and bearings for a horizontal shaft 85 carrying individual relatively rotatable film rollers 86, one for each upper roller 72 and staggered with relation thereto.

Between each bracket 70 and the side walls 16 of the tank the upper edge of partition 14 is cut down, as indicated at 88. A gate 90 of the width of said lowered edge 88 is mounted face to face against partition 14 and arranged to slide vertically in guides 91 affixed to said partition 14, clamping screws 92 being provided to set the gate at any desired elevation. As in the form above described the position of this gate determines the liquid level in the compartment behind it, and consequently primarily the quantity of liquid flow through channels 75 and therefore the speed of wheels 73 and film rollers 72.

The general operating characteristics of this form of the invention are similar to those of the form previously described, although the present form has certain advantages which will now be mentioned. It will be noted, for instance, that each of the upper or driving film rollers is individually driven by an individual wheel. The speed of each roller will therefore more readily follow or be controlled by the amount of tension in the single film loop with which it is directly associated. Thus if its film loop becomes lengthened, the wheel and roller immediately ahead will instantly speed up to take up the slack and move it on to the next loop ahead. In this way the speeds of the film driving rollers are accurately controlled by the condition of the film at all points in the machine, the machine tending automatically toward a condition in which the film tension is constant and at the value desired throughout. It will be understood each drive roller must in practice slightly overdrive the film and therefore put a tension on the film. The several tensions are cumulative, but the nature of my machine is such that the tensions can be so accurately controlled that their sum never exceeds a permissible figure.

I have now described a form in which each film driving roller is provided with an individual impeller wheel, but obviously this may not in all cases be necessary. For instance, the wheels may be omitted from selected ones of the upper rollers 72, in which case said rollers will serve simply as idlers and the rollers having the wheels will control and drive more than one film loop. Such an arrangement is of course within the scope of my invention.

In Figs. 13 to 17 I have illustrated another form of my invention. As there shown numerals 100 and 101 indicate adjacent tanks, which may be considered as a developer and hypo tank, respectively. An additional tank will of course be required for the final wash, but this may be substantially a duplicate of either tank 100 or 101 and hence is not illustrated. While the arrangements within tanks 100 and 101 embody certain similar fundamental characteristics, they differ in certain important respects and each will therefore be considered separately.

Tank 100, which will be considered first, is divided into vertical cells 102 by vertical longitudinal partitions 103 and alternate transverse partitions 104 and 105. Longitudinal partitions 103 and a transverse partition 105 are shown as of the same height as of the side walls of the tank, whereas the transverse partitions 104 that alternate with partitions 105 terminate somewhat below the upper edge of the tank, as clearly shown in Fig. 13. In the apparatus shown, the tank is thus divided into four longitudinal rows of vertical cells 102, although this number is of course not limitative on the invention.

Figure 13:
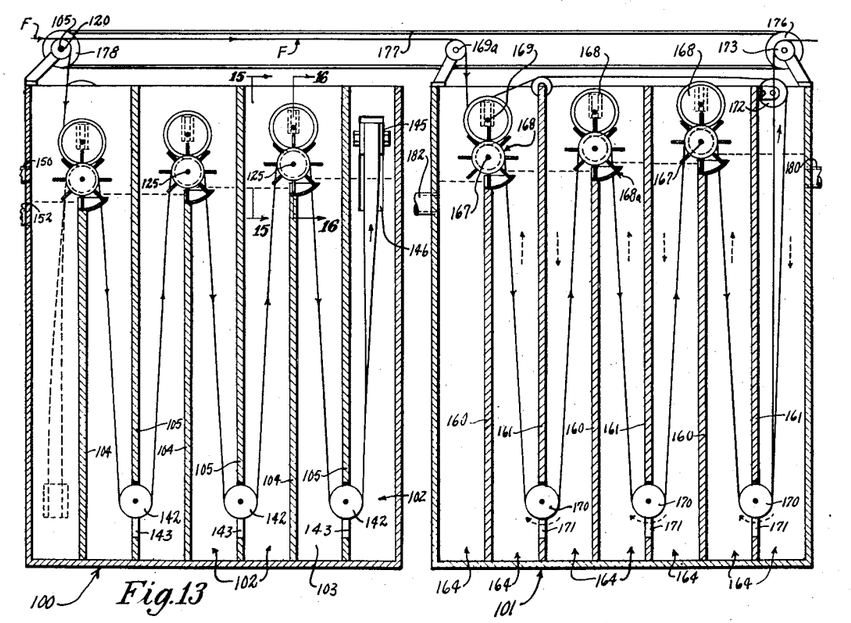
Fig. 13 is a view of a variational form of my invention, being a section taken on line 13—13 of Fig. 14.

A transverse drive shaft 105 is journaled in brackets 106 mounted on the left hand side wall of the tank, as viewed in Fig. 13, said shaft having a sprocket 107 and driving chain 108. Shaft 105 has a film sprocket 120 alined with the first of the four longitudinal rows of cells 102, and a film sprocket 121 alined with the last of said rows of cells.

Horizontally mounted over each of the short vertical transverse partitions 104 and extending transversely through longitudinal partitions 103 is a fixed shaft 125, and rotatably mounted on said shaft 125, one within each cell 102, is a series of film rollers 126, each having formed integrally with each of its sides an impeller wheel 128. The upper edge of partition 104 within each cell 102 supports wheel channels 131 below wheels 128, and is provided with vertical guides 132 between said channels for a vertically adjustable level determining gate 133. Channels 131 are arranged to discharge liquid from left to right over partitions 104 in the first cell row, from right to left over the partitions in the next row, and so on in alternate directions.

Over each film roller 126 is a presser roll 135 having film treads 136 resting on the edges of the film passing over roller 126, and having flanges 137 for lateral positioning of the film. Rolls 135 are on shafts 138 whose ends float vertically between guide plates 139.

Figure 14:
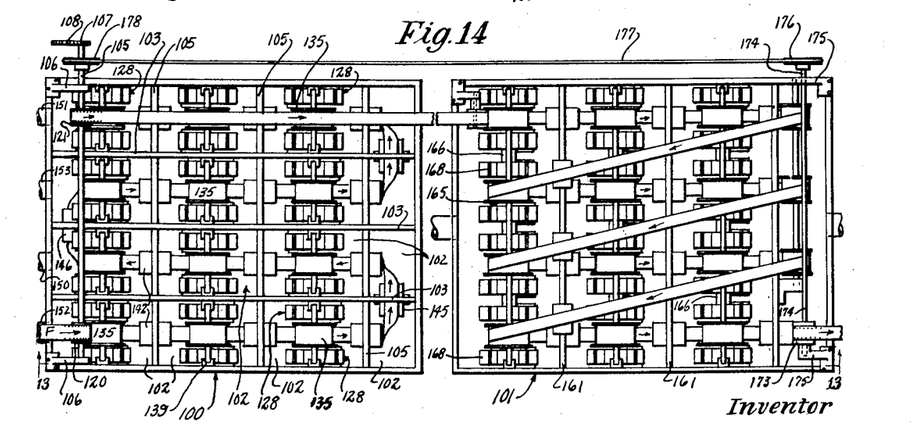
Fig. 14 is a plan view of the apparatus shown in Fig. 13.
Figure 15:
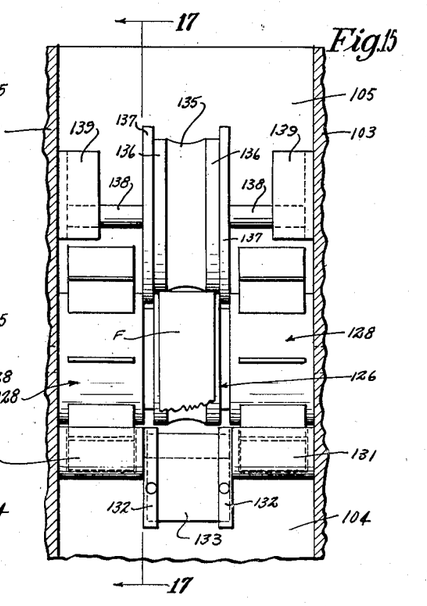
Fig. 15 is a section taken on line 15—15 of Fig. 13.
Figure 16:
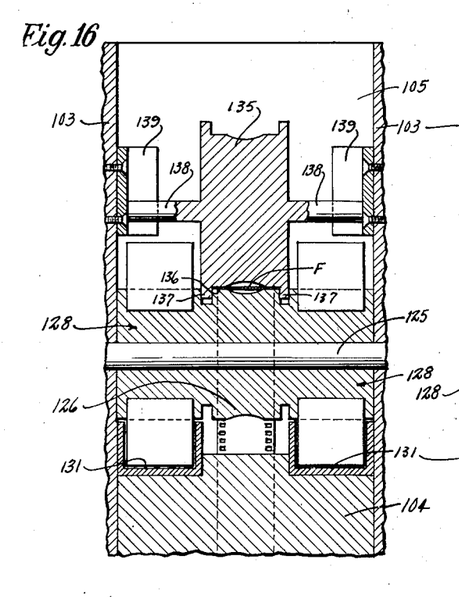
Fig. 16 is a section taken on line 16—16, Fig. 13
Figure 17:
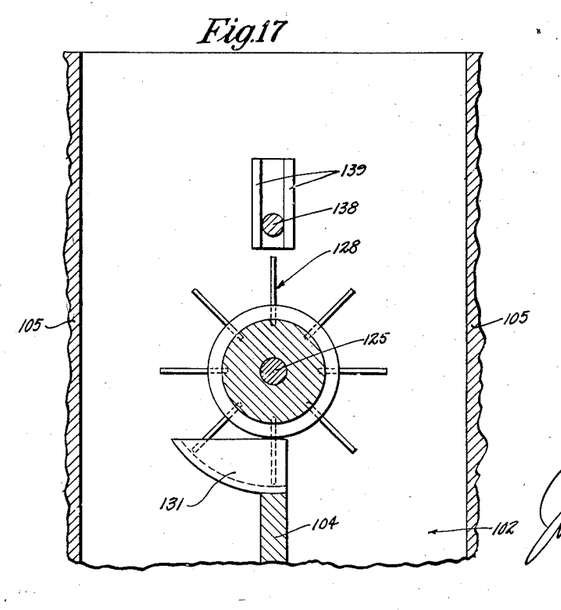
Fig. 17 is a section taken on line 17—17, Fig. 15.

The incoming film F is threaded over the first upper film roll 126 of the first longitudinal cell roll (lower cell row as viewed in plan in Fig. 14). The film thence passes downwardly through the second cell 102 from the left hand end of the row to pass around an idler roller 142 mounted in an aperture 143 near the lower end of partition 105. It may here be noted that sufficient clearance is provided between roller 142 and the lower edge of aperture 143 for the free passage of liquid between the adjacent cells. From roller 142 the film passes upwardly in the third cell 102 to the upper film roller 126, around which it is threaded to pass downwardly in the fourth cell, and so on in this zig zag manner to the end of the row.

The arrangement is made such that the film strip rises in the last cell 102 of the first row, and the film is given a 90° twist in said cell to pass over an idler roller 145 mounted near the top of the partition 103 defining the inner side of said last cell 102, said aperture 146 being sufficiently large to allow the free pasage of liquid between the adjacent cells. From roller 145 the film is threaded downwardly through the adjacent cell 102 of the second cell roll and given a 90° twist to pass under the idler roller 142 in the lower end of the partition or wall 105 of that cell. The film is thus threaded in a zig zag path around the upper and lower rollers 126 and 142 through successive cells 102 to the outgoing end of the second cell row. In the last cell of row number two the film is taken downwardly through a 90° twist under a roller 146 mounted in the next partition 103 (see Fig. 14), and then upwardly through a 90° twist in the adjacent cell 102 of the third row, through which the film is then threaded. At the end of the third row the film passes over a roller 148 in the next longitudinal partition 103 to enter the adjacent cell of the fourth row, and from the outgoing end of the fourth row the film rises to pass over the film sprocket 121 on shaft 105.

In the form of apparatus here shown, the cells 102 at the film outgoing ends of the second and fourth cell rows are provided with liquid inlet pipes 150 and 151, respectively, while the cells at the film ingoing ends of the first and third rows are provided with liquid outlet pipes 152 and 153, respectively. In case the first and second cell rows are to be used for the developing treatment and third and fourth for fixing the film, developer will be introduced through inlet 150 and hypo through inlet 151. The liquid introduced to the cells through the inlets rises in the cells to a certain level, depending upon the rate of supply and other factors.

Considering first cell row number two, the developer introduced to the first cell of said row will flow through the wheel channels 131 into the second cell, thereby rotating the associated wheels 128 and film roller 126 to move the film. The liquid then flows downwardly in cell number two to pass through aperture 143 into the third cell, wherein it rises to a certain level somewhat below that in the first cell. For this reason the impeller wheels in successive cells are mounted at decreasing elevations in the direction of liquid flow, as will be understood from Fig. 13. In a similar manner the liquid in cell number three flows under the next wheel 128 into cell number four, flowing downwardly therein and upwardly in the next cell, and so on. At the end of the cell row the liquid flows through the aperture 146 in wall 103 to the end cell of the first row, flowing downwardly therein and upwardly in the next cell back. From that cell the liquid flows under the associated water wheels to and downwardly through the next cell, and so on, the liquid finally leaving the left hand cell of the first row by way of pipe 152, which is of course located to provide a proper drop in elevation of the liquid flowing through the apparatus. In an exactly similar manner liquid flow from inlet 151 flows through rows four and three to outlet 153 to drive the wheels of those rows, finally leaving by way of pipe 153.

The film driving rollers are thus all separately driven by individual impellers. In the present arrangement, as in the forms previously described, there is preferably provided the hold back sprocket 105 at the ingoing end of the film. The adjustments of the several gates and the rate of liquid flow are therefore preferably again made such that the film will tend to be driven at a speed just slightly greater than permitted by the constant speed of the hold back sprocket, so that the conditions of frictional overdrive will again obtain.

I proceed now to a description of the variational arrangement shown in tank 101. Tank 101 is divided simply by alternate transverse partitions 160 and 161, similar respectively to the transverse partitions 104 and 105 in tank 100, so that here the tank is divided into successive long transverse compartments 164.

Upper film rollers 165 are rotatably mounted on long shafts 167 arranged over partitions 160, said rollers having undershot wheel impellers 168 as in the arrangement within tank 100. The impellers of adjacent rollers are here spaced by sleeves 166 on shaft 167. The impeller wheels are again provided with wheel channels, as indicated at 168a, and vertically adjustable gates are again provided in the same manner as previously shown in Fig. 15 in connection with the description of the apparatus within tank 100. The presser rolls 168 are mounted on long shafts 169, as clearly shown in the drawings, the film taken from sprocket 121 of tank 100, is threaded over a sprocket 169a mounted on tank 101, thence over the first film roller 126 in the first longitudinal row of rollers (upper row as viewed in plan in Fig. 14) to pass downwardly in the second compartment 164 from the left hand end of the tank, as clearly shown in Fig. 13. At the lower end of said second compartment 164 the film passes under an individual roller 170 in an aperture 171 in compartment wall 161 to rise in the third compartment 164. In the final compartment 164 the film rises to pass around a roller 172 mounted on the last partition 161, and from there passes back to the first roller 126 of the second roller row, through which the film then threads in a manner similar to its arrangement in the first roller row. This arrangement is continued until finally, after passing over the fourth row of rollers to the last compartment 164, the film rises to pass over the final take-out sprocket 173, which is mounted on a shaft 174 rotatable in a pair of bearing brackets 175 mounted on tank 101. Shaft 174 has on one end a sprocket 176 connected by a chain 177 with a sprocket 178 on shaft 105. It will be observed that by this arrangement the film sprocket 121 that functions as the take-out for tank 100 also functions as a constant feed or hold-back sprocket for tank 101, while the take-out sprocket 103 for tank 101 is driven constantly at the same speed as sprocket 121. By this arrangement there is maintained a constant length of film (constant number of sprocket holes) in each of tanks 100 and 101, as well as in tanks 100 and 101 taken together, as will now be understood.

The treating liquid (in the present instance wash water) is introduced to tank 101 through an inlet pipe 180 discharging into the last or film outgoing compartment 164. This liquid maintains a level in said last compartment 164, as indicated, but flows downwardly to pass through aperture 71 at the lower end of the adjacent partition 161, and rises to a certain level in the next compartment 164 (which level is of course below the level in the entering compartment), from which it can flow under and drive a transverse row of wheels 128 associated with that compartment. After thus flowing under and rotating said transverse row of impeller wheels the liquid flows downwardly in the next compartment, upwardly in the succeeding compartment, and so on. The liquid levels in successive compartments as before decrease in elevation in the direction of flow, and the successive rows of impellers are therefore mounted to conform to this falling gradient, as clearly shown in the drawings. The liquid is finally discharged from the tank by way of an outlet pipe 182 leading from the extreme left hand compartment 164, said outlet being of course located to provide a proper drop in elevation of the liquid flowing through the apparatus.

It will be understood the drawings and description are to be considered merely as illustrative of and not restrictive on the broader claims appended hereto, for various changes in design, structure and arrangement may be made without departing from the spirit and scope of said claims.

I claim:

1. In film treating apparatus, the combination of means providing a conduit for the flow of liquid, impeller wheels mounted to be driven by the flow of liquid through said conduit, and film driving means operated by said impeller wheels.

2. In film treating apparatus, the combination of means providing a conduit for the flow of liquid, impeller wheels mounted to be driven by the flow of liquid through said conduit, and film driving rollers operated by said impeller wheels.

3. In film treating apparatus, the combination of means providing a conduit for the flow of liquid, undershot wheels mounted to be driven by the flow of liquid through said conduit, and film driving rollers operated by said undershot wheels.

4. In film treating apparatus, the combination of a container through which a film strip may be guided, means for flowing liquid through said container, and film impellers adapted to be operated by the flow of said liquid.

5. In film treating apparatus, the combination of a container through which a film strip may be guided, means for flowing liquid through said container, impeller wheels adapted to be driven by the liquid flowing through said container, and film driving means operated by said impeller wheels.

6. In film treating apparatus, the combination of a container through which a film strip may be guided, means for flowing liquid through said container, impeller wheels adapted to be driven by the liquid flowing through said container, and film driving rollers operated by said impeller wheels.

7. In film treating apparatus, the combination of a container through which a film strip may be guided, means for flowing liquid through said container, wheels adapted to be driven by the liquid flowing through said container, and film driving means operated by said wheels.

8. In film treating apparatus, the combination of a container through which a film strip may be guided, means for flowing a liquid through said container, a liquid overflow member in said container, a wheel adapted to be driven by liquid overflowing said member, and film driving means operated by said wheel.

9. In film treating apparatus, the combination of a container through which a film strip may be guided, means for flowing a liquid through said container, a liquid overflow member in said container, a wheel adapted to be driven by a part of the liquid overflowing said member, and film driving means operated by said wheel.

10. In film treating apparatus, the combination of a container through which a film strip may be guided, means for flowing a liquid through said container, a liquid overflow member in said container, a wheel adapted to be driven by a part of the liquid overflowing said member, means for controlling the amount of liquid operating the wheel, and film driving means operated by said wheel.

11. In film treating apparatus, the combination of a container through which a film strip may be guided, means for flowing a liquid through said container, a liquid overflow member in said container, a wheel adapted to be driven by liquid overflowing said member, means for controlling the amount of liquid overflowing said member, and film driving means operated by said wheel.

12. In film treating apparatus, the combination of a container through which a film strip may be guided, means for flowing a liquid through said container, a liquid overflow member in said container, a wheel adapted to be driven by a part of the liquid overflowing said member, means for adjusting the mean elevation of said member relative to the wheel, and film driving means operated by said wheel.

13. In film treating apparatus, the combination of a container through which a film strip may be guided, means for flowing a liquid through said container, a liquid overflow member in said container, means for adjusting the elevation of said overflow member, a wheel adapted to be driven by liquid overflowing said member, and film driving means operated by said wheel.

14. In film treating apparatus, the combination of a container through which a film strip may be guided, means for flowing a liquid through said container, a wall in said container having a liquid overflow edge, a wheel arranged to be driven by liquid overflowing said edge, an adjustable overflow gate arranged in said wall to control the liquid operating the wheel, and film driving means operated by said wheel.

15. In film treating apparatus, the combination of a container through which a film strip may be guided, means for flowing a liquid through said container, a wall in said container having a liquid overflow edge, a wheel arranged to be driven by liquid overflowing said edge, a vertically adjustable level establishing gate arranged in said wall to control the liquid level behind the wall, and film driving means operated by said wheel.

16. In film treating apparatus, the combination of a container through which a film strip may be guided, means for flowing a liquid through said container, a vertical wall in said container having a liquid overflow edge, a shaft horizontally mounted substantially in the plane of said wall, a wheel mounted to be driven by liquid flowing over said overflow edge and arranged to drive said shaft, and a film drive roller driven by said shaft.

17. In film treating apparatus, the combination of a container through which a film strip may be guided, means for flowing a liquid through said container, a vertical wall in said container having a liquid overflow edge, a shaft horizontally mounted substantially in the plane of said wall, a wheel mounted on said shaft and arranged to be driven by liquid flowing over said overflow edge, and a film drive roller mounted on said shaft.

18. In film treating apparatus, the combination of a container, a vertical wall dividing said container into two compartments, means for introducing liquid to one of said compartments, said vertical wall having a liquid overflow edge such that said liquid flows thereover to the other compartment, means for withdrawing liquid from the last mentioned compartment, a wheel mounted to be driven by liquid flowing over said overflow edge, and film driving means operated by said wheel.

19. In film treating apparatus, the combination of a container, a vertical wall dividing said container into two compartments, means for introducing liquid to one of said compartments, said vertical wall having a liquid overflow edge such that said liquid flows thereover to the other compartment, means for withdrawing liquid from the last mentioned compartment, a wheel mounted to be driven by liquid flowing over said overflow edge, and a film driving roller mounted at the upper end of the vertical wall and driven by said wheel.

20. In film treating apparatus, the combination of a container, a vertical wall dividing said container into two compartments, means for introducing liquid to one of said compartments, said vertical wall having a liquid overflow edge such that said liquid flows thereover to the other compartment, means for withdrawing liquid from the last mentioned compartment, a wheel mounted to be driven by liquid flowing over said overflow edge, a film driving roller mounted at the upper end of the vertical wall and driven by said wheel, and a presser roller pressing the film strip against the film engaging surface of the film driving roller.

21. In film treating apparatus, the combination of a container through which a film strip may be guided, means for flowing liquid through said container, impeller wheels adapted to be driven by the liquid flowing through the container, film driving rollers having film engaging treads, said rollers engaging the film strip at spaced points, and presser rollers pressing the film strip against the film treads of the driving rollers.

22. In film treating apparatus, the combination of a container, a vertical wall dividing said container into two compartments, means for introducing liquid to one of said compartments, said vertical wall having a liquid overflow edge such that said liquid flows thereover to the other compartment, means for withdrawing liquid from the last mentioned compartment, a wheel mounted to be driven by liquid flowing over said overflow edge, a vertically adjustable overflow gate forming a part of the overflow edge, and film driving means operated by said wheel.

23. In film treating apparatus, the combination of a container, a vertical wall dividing said container into two compartments, means for introducing liquid to one of said compartments, said vertical wall having an upper flow edge over which liquid may flow from said one compartment to the other compartment, a wheel mounted to be driven by the liquid flow over said edge, a vertically adjustable overflow gate arranged in said vertical wall and controlling the level of the liquid in the first mentioned compartment and thereby the flow of liquid driving the wheel, means for withdrawing liquid from the last mentioned compartment, and film driving rollers driven by said wheel.

24. In film treating apparatus, the combination of a container, a vertical wall dividing said container into two compartments, means for introducing liquid to one of said compartments, said wall having an upper flow edge over which liquid may flow from said one compartment to the other compartment, a wheel mounted to be driven by the liquid flow over said edge, means for withdrawing liquid from the last mentioned compartment, and film driving rollers mounted over said vertical wall and operated by said wheel, said film driving rollers arranged to guide a film strip from one compartment over the vertical wall to the other compartment.

25. In film treating apparatus, the combination of a container, a vertical wall dividing said container into two compartments, means for introducing liquid to one of said compartments, said wall having an upper flow edge over which liquid may flow from said one compartment to the other compartment, a wheel mounted to be driven by the liquid flow over said edge, means for withdrawing liquid from the last mentioned compartment, film driving rollers mounted over said vertical wall and driven by the wheel, and free film rollers mounted in an aperture at the lower end of said wall, said film driving and free rollers adapted to carry the film strip in a spiral around said vertical wall.

26. In film treating apparatus, the combination of a container, a vertical wall dividing said container into two compartments, means for introducing liquid to one of said compartments, said wall having an upper flow edge over which liquid may flow from said one compartment to the other compartment, a wheel mounted to be driven by the liquid flow over said edge, means for withdrawing liquid from the last mentioned compartment, film driving rollers mounted over said vertical wall and driven by the wheel, and film guides provided through the lower end of said wall, the film strip being wound in a spiral around said film driving rollers and guides.

27. In film treating apparatus, the combination of a container, a vertical wall dividing said container into two compartments, means for introducing liquid to one of said compartments, said wall having an upper flow edge over which liquid may flow from said one compartment to the other compartment, a wheel mounted to be driven by the liquid flow over said edge, means for withdrawing liquid from the last mentioned compartment, a horizontal shaft mounted over said vertical wall and driven by the wheel, a plurality of film driving rollers fast on said shaft, and free film rollers mounted in an aperture at the lower end of said wall, the film driving and free rollers carrying the film strip in a spiral around said vertical wall.

28. In film treating apparatus, the combination of a container, spaced vertical walls dividing said container into a series of compartments, means for introducing liquid to the first of said compartments, each of said vertical walls having an overflow edge such that said liquid flows successively from compartment to compartment, a wheel mounted over the overflow edge of each wall and adapted to be driven by liquid flow thereover, means for withdrawing liquid from the last compartment, a horizontal shaft mounted over each vertical wall and driven by the wheel associated therewith, a plurality of film driving rollers fast on said shaft, and a corresponding plurality of free film rollers mounted in an aperture in the bottom of each of said vertical walls, the film strip being wound in successive spirals around the film driving and free rollers of the several vertical walls.

29. In film treating apparatus, the combination of a container, means for flowing a liquid through said container, and impeller wheels driven by the flow of said liquid adapted to engage a film strip at spaced points to drive it through the container.

30. In film treating apparatus, the combination of a container, means for flowing a liquid through the container, free film rollers arranged in the container to carry a film strip, and liquid-flow driven wheels driving the film at spaced points.

31. In film treating apparatus, the combination of a container, a vertical wall dividing said container into two compartments, means for supplying liquid to one of said compartments, said liquid flowing over the vertical wall into the other compartment, means for withdrawing liquid from the last mentioned compartment, a plurality of individual film rollers mounted over said vertical wall, a plurality of wheels mounted over said vertical wall to be driven by the liquid flow thereover and drivingly connected to said film rollers, and free film rollers mounted in an aperture at the lower end of the vertical wall, the film being threaded in a spiral over the rollers at the upper and lower ends of the vertical wall.

32. In film treating apparatus, the combination of a container, a vertical wall dividing said container into two compartments, means for supplying liquid to one of said compartments, said liquid flowing over the vertical wall into the other compartment, means for withdrawing liquid from the last mentioned compartment, a plurality of individual film drive rollers mounted over said vertical wall, a plurality of wheels mounted over said vertical wall to be driven by liquid flow thereover and spaced between said film drive rollers, one wheel arranged to drive each film roller, and a corresponding plurality of free film rollers mounted in an aperture at the lower end of the vertical wall, the film being threaded in a spiral around the rollers at the upper and lower ends of the vertical wall.

33. In film treating apparatus, the combination of a container, spaced vertical walls dividing said container into a series of compartments, means for introducing liquid to the first compartment of said series, said liquid flowing successively from compartment to compartment over said vertical walls, means for withdrawing liquid from the last compartment of the series, a plurality of individual film rollers mounted over each of said vertical walls, a wheel mounted over each of said walls to be driven by liquid flow thereover, said wheel arranged to drive one of said film rollers, and a plurality of free lower film rollers mounted in an aperture in the bottom of each of said vertical walls, the film strip being wound in successive spirals around the upper and lower film rollers of the several vertical walls.

34. In film treating apparatus, the combination of a container, spaced vertical walls dividing said container into a series of compartments, means for introducing liquid to the first compartment of said series, said l'quid flowing successively from compartment to compartment over said vertical walls, means for withdrawing liquid from the last compartment of the series, a plurality of individual film rollers mounted over each of said vertical walls, a wheel fast to each of said film rollers and arranged to be driven by the liquid flow over the vertical wall, and a plurality of free lower film rollers mounted in an aperture in the bottom of each of said vertical walls, the film strip being wound in successive spirals around the upper and lower film rollers of the several vertical walls.

35. In film treating apparatus, the combination of a tank, a vertically removable vertical partition dividing said tank into compartments, a film driving roller supported by and at the upper end of said partition, said partition having a flow edge over which liquid supplied to one compartment flows to the other compartment, and a wheel supported by and at the upper of the vertical partition so as to be driven by the liquid flow over said flow edge, said wheel being arranged to drive the film driving roller.

36. In film treating apparatus, the combination of a tank, a vertically removable vertical partition div'ding said tank into compartments, a film driving roller supported by and at the upper end of said partition, said partition having a flow edge over which liqu'd supplied to one compartment flows to the other compartment, and a wheel fast to said film driving roller and arranged to be dr'ven by the liquid flow over said flow edge.

37. In film treating apparatus, the combination of a conduit comprising a succession of vertical compartments commun'cating each to the next alternately at their lower and upper ends so that liquid can be flowed therethrough, a wheel mounted at each communication between the upper ends of successive compartments and arranged to be dr'ven by the liquid flow therethrough, a film drive roller fast to each of said wheels, and a free film roller in each communication between the lower ends of successive compartments, the film strip being threaded over the film drive rollers and under the free rollers to travel through the successive compartments oppositely to the direction of liquid flow.

38. In film treating apparatus, the combination of a container, means for flowing liquid through said container, an impeller wheel operated by the flow of said liquid, film driving means driven by said impeller wheel, and a constantly driven means for feeding a film strip to said film driving means.

39. In film treating apparatus, the combination of a container, means for flowing liquid through said container, an impeller wheel operated by the flow of said liquid, film driving means driven by said impeller wheel, a constantly driven means for feeding a film strip to said film driving means, and a constantly driven means for taking the film strip from said film driving means.

In witness that I claim the foregoing I have hereunto subscribed my name this 10 day of March, 1931.

JAMES T. BARKELEW.